(12) United States Patent
Nishikawa et al.

(10) Patent No.: US 6,297,911 B1
(45) Date of Patent: Oct. 2, 2001

(54) MICRO LENS ARRAY, METHOD OF FABRICATING THE SAME, AND DISPLAY DEVICE

(75) Inventors: Takao Nishikawa, Shiojiri; Takayuki Kondo, Suwa, both of (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/383,798

(22) Filed: Aug. 26, 1999

Related U.S. Application Data

(63) Continuation-in-part of application No. 09/349,888, filed on Jul. 8, 1999, now abandoned, and a continuation-in-part of application No. 09/371,679, filed on Aug. 10, 1999.

(30) Foreign Application Priority Data

Aug. 27, 1998 (JP) .................................................. 10-257567

(51) Int. Cl.[7] .................................................. G02B 27/10
(52) U.S. Cl. ........................................... 359/619; 359/455
(58) Field of Search .................................... 359/619, 621, 359/622, 453, 457, 455; 349/95

(56) References Cited

U.S. PATENT DOCUMENTS

| 5,466,926 | * | 11/1995 | Sasano et al. | 250/216 |
| 5,952,129 | * | 9/1999 | Kiguchi et al. | 430/7 |
| 6,022,647 | * | 2/2000 | Hirosi et al. | 430/7 |
| 6,063,527 | * | 5/2000 | Nishikawa et al. | 430/7 |
| 6,129,866 | * | 10/2000 | Hamanaka et al. | 264/1.7 |
| 6,211,916 | * | 4/2001 | Hawkins et al. | 348/340 |

FOREIGN PATENT DOCUMENTS

| 3-198003 | | 8/1991 | (JP) . | |
| 405303009 | * | 11/1993 | (JP) | G02B/3/10 |

* cited by examiner

Primary Examiner—Georgia Epps
Assistant Examiner—Saeed Seyrafi
(74) Attorney, Agent, or Firm—Harness, Dickey & Pierce, P.L.C.

(57) ABSTRACT

A method of manufacturing a micro lens array comprising a step of forming a color pattern layer including a plurality of pixels in a predetermined arrangement on a light transmitting substrate, and a step of curving surfaces of the pixels in the color pattern layer corresponding to lens surfaces, wherein in the step of curving the surfaces of the pixels, the pixels are melted by heating to cause the surfaces of the pixels to be convexly curved by surface tension.

29 Claims, 15 Drawing Sheets

MICRO LENS ARRAY, METHOD OF FABRICATING THE SAME, AND DISPLAY DEVICE

This is a continuation-in-part of U.S. patent application Ser. No. 09/349,888, filed Jul. 8, 1999 now is abandoned and application Ser. No. 09/371,679 filed Aug. 10, 1999.

BACKGROUND OF THE INVENTION

1. Field of the Invention

The present invention relates to a micro lens array, a method of manufacturing the same, and a display device.

2. Description of Related Art

A micro lens array formed by arranging a plurality of micro lenses has been applied to liquid crystal panels, for example. Each lens of the micro lens array converges incident light upon each pixel to illuminate a display screen.

A micro lens array can illuminate a display screen, but a color display function has not been taken into consideration in conventional methods of manufacturing a micro lens array.

SUMMARY OF THE INVENTION

The present invention has been achieved to solve the above problem, and has as an objective thereof the provision of a micro lens array capable of displaying a color image as well as illuminating a screen, a method of manufacturing the same, and a display device.

(1) A method of manufacturing a micro lens array according to the present invention comprises:

a step of forming a color pattern layer including a plurality of pixels in a predetermined arrangement on a light transmitting substrate; and a step of curving surfaces of the pixels in the color pattern layer corresponding to lens surfaces.

According to the present invention, pixels with curved surfaces corresponding to lens surfaces form a micro lens array. Since the pixels are formed by partitioning the color pattern layer, the pixels have the same color as the color pattern layer. Therefore, the micro lens array also has a function of a color filter.

(2) In this manufacturing method, the pixels in the color pattern layer may be formed with multiple colors;

in the formation of the color pattern layer, a step of forming a radiation sensitive layer having any one of the multiple colors on the substrate and then selectively removing part of the radiation sensitive layer to form part of the pixels may be repeated; and in the step of curving the surfaces of the pixels, the pixels may be melted by heating to cause the surfaces of the pixels to be convexly curved by surface tension.

The pixels having the same one color are formed by selectively removing part of the radiation sensitive layer. Therefore, the color pattern layer can be formed by repeating the step of forming the radiation sensitive layer and selectively removing the radiation sensitive layer for a number of times corresponding to the number of colors of pixels.

(3) In this manufacturing method, the step of forming the color pattern layer may include a step of attaching a surface of a master mold on which a plurality of projections are formed to the substrate through a coloring material filling layer precursor, a step of removing the master mold from the coloring material filling layer precursor to form a coloring material filling layer having a plurality of recesses on the substrate, and a step filling each of the recesses with a coloring material having a predetermined color to form the pixels from the coloring material in the recesses; and in the step of curving the surfaces of the pixels, the coloring material in the recesses may be melted by heating to cause the surface of the coloring material to be convexly curved by surface tension.

The coloring material filling layer having recesses can be formed by transferring the shape of the projections of the master mold to the coloring material filling layer precursor. The pixels are formed by filling the recesses with the coloring material, and the coloring material forming the pixels is melted by heating. The surfaces of the pixels are convexly curved by surface tension, whereby lens surfaces of a micro lens array can be easily formed.

(4) In this manufacturing method, the step of forming the color pattern layer may include a step of providing a partitioning member on the substrate to form a plurality of recesses capable of holding a liquid, and a step of filling each of the recesses with the coloring material having a predetermined color to form the pixels from the coloring material in the recesses; and in the step of curving the surfaces of the pixels, the coloring material in the recesses may be melted by heating to cause the surface of the coloring material to be convexly curved by surface tension.

According to this method, the recesses are formed by providing the partitioning member on the substrate. The pixels are formed by filling the recesses with the coloring material, and the coloring material forming the pixels is melted by heating. The surfaces of the pixels are convexly curved by surface tension, whereby lens surfaces of a micro lens array can be easily formed.

(5) In this manufacturing method, the step of forming the color pattern layer may include a first step of providing a partitioning member on the substrate to form a plurality of recesses capable of holding a liquid, and a second step of filling each of the recesses with the coloring material having a predetermined color to form the pixels from the coloring material in the recesses, the partitioning member having the property of repelling the coloring material;

the step of curving the surfaces of the pixels may be carried out in the second step; and the surface of the coloring material in the recesses may be convexly curved by being repelled by the partitioning member.

According to this method, the recesses are formed by providing the partitioning member on the substrate. The pixels are formed by filling the recesses with the coloring material. The partitioning member repels the coloring material. Therefore, only by filling the recesses with the coloring material, the surface of the coloring material can be convexly curved by being repelled by the partitioning member, whereby the lens surfaces of the micro lens array can be easily formed.

(6) In this manufacturing method, the partitioning member may be formed of a shading material.

The partitioning member is thus provided with a function of a black matrix.

(7) A method of manufacturing a micro lens array according to the present invention comprises:

a step of forming a light transmitting substrate in which a plurality of concavities having curved surfaces corresponding to lens surfaces are formed in a predetermined arrangement; and a step of forming a color pattern layer in the concavities.

According to the present invention, the color pattern layer is formed in the concavities having curved surfaces corresponding to lens surfaces, and the lenses are formed in each concavity to form a micro lens array. Because the micro lens array has the color of the color pattern layer, the micro lens array also has a function of a color filter.

(8) In this manufacturing method, the step of forming the substrate may comprise a step of forming the concavities by etching a flat surface.

The shape of the concavities can be changed accurately as well as freely by changing the etching conditions.

(9) In this manufacturing method, the step of forming the substrate may comprise:
  a step of attaching a surface of a master mold on which a plurality of convexities having a shape inverse to the concavities are formed to a reinforcing plate through a substrate precursor; and
  a step of removing the master mold from the substrate precursor to form the substrate having the concavities on the reinforcing plate.

Since the shape of the convexities of the master mold is transferred to the substrate precursor to form the concavities, the concavities can be easily formed.

(10) This method of manufacturing a micro lens array may further comprise a step of removing the reinforcing plate from the substrate.

If the substrate itself has a sufficient strength, the reinforcing plate may be removed.

(11) In this manufacturing method, the step of forming the color pattern layer may be carried out by filling each of the concavities with a coloring material having a predetermined color.

(12) In this manufacturing method, the step of forming the color pattern layer may include a step of forming a coloring material receiving layer in a predetermined area including the concavities and a step of causing the coloring material having a predetermined color to be absorbed into the coloring material receiving layer in the concavities.

(13) In this manufacturing method, the coloring material receiving layer may be continuously formed in and over the concavities, and the coloring material may be absorbed into the coloring material receiving layer only within the concavities.

(14) In this manufacturing method, the coloring material receiving layer may be formed only in the concavities.

(15) A method of manufacturing a micro lens array according to the present invention comprises:
  a step of forming a master mold including a plurality of concavities having curved surfaces corresponding to lens surfaces;
  a step of forming a color pattern layer in the concavities; and
  a step of removing the color pattern layer from the master mold.

According to the present invention, the color pattern layer is formed in the concavities having curved surfaces corresponding to lens surfaces, and the color pattern layer having a plurality of lenses corresponding to the concavities form a micro lens array. Because the micro lens array has the same color as the color pattern layer, the micro lens array also has a function of a color filter.

(16) This method of manufacturing a micro lens array may further comprise a step of attaching the color pattern layer to a reinforcing plate through a light transmitting layer precursor to form a light transmitting layer after the step of forming the color pattern layer and before the step removing the color pattern layer; and
  the color pattern layer may be removed from the master mold together with the reinforcing plate and the light transmitting layer in the step of removing the color pattern layer.

If the color pattern layer cannot be removed independently from the master mold, the light transmitting layer may be formed in this manner.

(17) This method of manufacturing a micro lens array may further comprise a step of removing the reinforcing plate from the light transmitting layer.

If the light transmitting layer and the color pattern layer have a sufficient strength, the reinforcing plate may be removed. After the reinforcing plate is removed, the light transmitting layer functions as a protective layer for the color pattern layer.

(18) In this manufacturing method, the step of forming the color pattern layer may include a step of forming a coloring material receiving layer in a predetermined area including the concavities and a step of causing a coloring material having a predetermined color to be absorbed into the coloring material receiving layer in the concavities.

(19) In this manufacturing method, the coloring material receiving layer may be continuously formed in and over the concavities, and the coloring material may be absorbed into the coloring material receiving layer only within the concavities.

(20) In this manufacturing method, the coloring material receiving layer may be formed only in the concavities.

(21) In this manufacturing method, the coloring material may be provided by an ink jet method.

(22) A micro lens array according to the present invention is manufactured by the above-described method.

(23) A micro lens array according to the present invention comprises a plurality of pixels having surfaces as lens surfaces, and the pixels are arranged with multiple colors.

According to the present invention, the pixels having surfaces as lens surfaces form a micro lens array. Moreover, the pixels function as a color filter.

(24) A display device according to the present invention comprises the above described micro lens array and a light source which emits light toward the micro lens array.

DETAILED DESCRIPTION OF PREFERRED EMBODIMENTS

Preferred embodiments of the present invention will be described with reference to the drawings.

First Embodiment

FIGS. 1A–1E illustrate a method of manufacturing a micro lens array according to a first embodiment of the present invention. In the present embodiment, a micro lens array having a function of a color filter is manufactured.

Figure 1A:
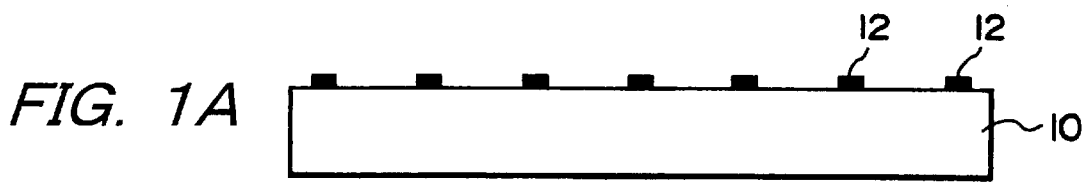
FIGS. 1A–1E illustrate a method of manufacturing a micro lens array according to a first embodiment of the present invention.

At first, a shading layer 12 is formed on a light transmitting substrate 10 as shown in FIG. 1A. The substrate 10 is a plate with a flat surface exhibiting mechanical strength so as to be able to maintain a plate-like shape. However, the substrate 10 may have other shapes. The substrate 10 may have a color insofar as the substrate 10 exhibits light transmissibility. As the substrate 10, a glass substrate, substrate made of plastics such as polycarbonate, polyallylate, polyether sulfone, amorphous polyolefin, polyethylene terephthalate, and polymethyl methacrylate, or film substrate can be used.

The shading layer 12 is configured so as to form a black matrix which is applied to a liquid crystal panel. The shading layer 12 is formed as follows. A layer consisting of chromium is formed to a predetermined thickness (for example, 0.15 μm) by a sputtering method or the like, and a resist layer (not shown) is then formed on this layer. After the resist layer is exposed to have a predetermined pattern, the resist layer is developed as a patterned layer. The chromium layer is etched using this patterned resist layer as a mask. The resist layer is then removed to form a patterned layer with shading characteristics, that is, the shading layer 12.

If the shading layer 12 is formed by laminating chromium and chromium oxide, the shading layer 12 exhibits low reflection due to light interference.

Alternatively, for example, a resin produced by dispersing a black dye, black pigment, or carbon black in a polyimide resin or acrylic resin may be used for the shading layer 12.

Figure 1B:
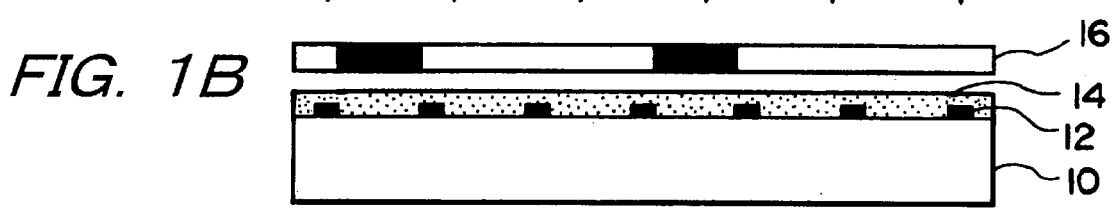

A radiation sensitive layer 14 is then formed on the substrate 10 and is exposed to radiation 18 as shown in FIG. 1B. The radiation sensitive layer 14 changes its physical properties by radiation (including light) and has one of the colors used for a color filter such as red, green, or blue. For example, the radiation sensitive layer 14 can be formed by applying a photopolymer obtained by dispersing a coloring material such as a pigment in a resin such as polyimide, on the substrate 10. As a method of the application, a spin coating method, roll coating method, dip coating method, and the like can be used. The thickness of the radiation sensitive layer 14 is about 1–2 μm, which depends on the required color characteristics or lens characteristics.

As the radiation 18, light with a wavelength from 200–500 nm can be used. If light within this wavelength range is used, photolithographic technology established in the manufacture of a liquid crystal panel and the facilities used for this technology can be utilized, thereby reducing production costs.

Only a predetermined area of the radiation sensitive layer 14 is then exposed. Specifically, the radiation sensitive layer 14 is exposed so that the radiation sensitive layer 14 remains only in the areas of the pixels having any one color according to the pixel arrangement of the color filter. As the pixel arrangement of the color filter, a mosaic arrangement, delta arrangement, and stripe arrangement have been known. A mask 16 is used for such exposure. For example, if parts of the radiation sensitive layer 14 exposed to radiation can be dissolved and removed, a mask 16 has a pattern for blocking the radiation 18 in the areas of the radiation sensitive layer 14 to be remained.

Figure 1C:
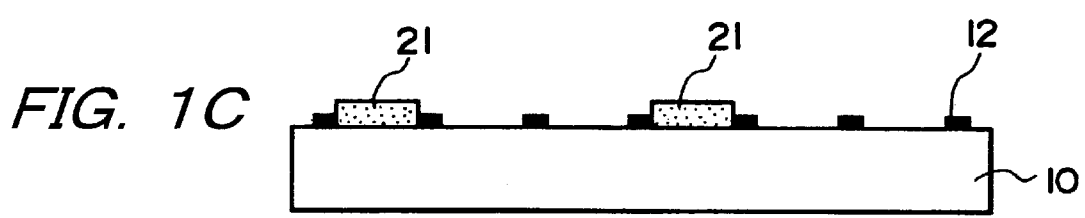

After exposure, unnecessary areas of the radiation sensitive layer 14 are dissolved and removed by a developer to form first pixels 21 as shown in FIG. 1C. As the developer, an alkaline aqueous solution such as tetramethylammonium hydroxide, sodium hydroxide, potassium hydroxide, calcium hydroxide, and a mixed solution of trisodium phosphate and sodium silicate can be used.

Figure 1D:
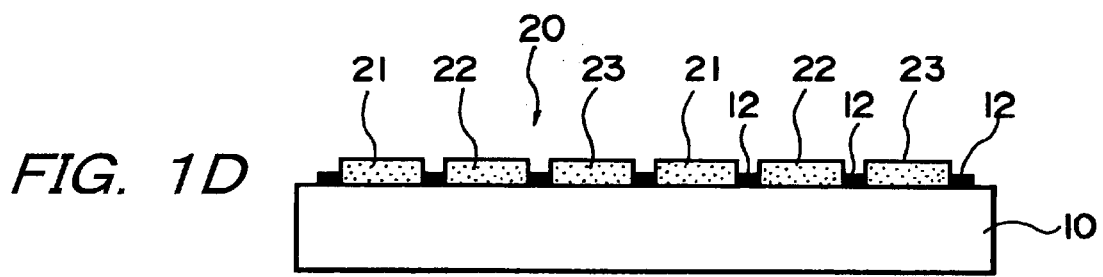

In the same manner, second pixels 22 are formed from a radiation sensitive layer (not shown) having a color different from that of the radiation sensitive layer 14, and third pixels 23 are formed from a radiation sensitive layer (not shown) having a color different from those of the radiation sensitive layer 14 and the radiation sensitive layer for the pixels 22, as shown in FIG. 1D. For providing a function of a color filter having two or more colors, a step of forming pixels for each color is repeated the same number of times as the number of colors. For providing a function of a color filter with one color, parts of the radiation sensitive layer over the shading layer 12 are removed to partition the radiation sensitive layer into a plurality of pixels.

The first pixels 21, second pixels 22, and third pixels 23 are thus formed in the area partitioned by the shading layer 12 as a black matrix. The pixels 21, 22, and 23 form a color pattern layer 20.

Figure 1E:
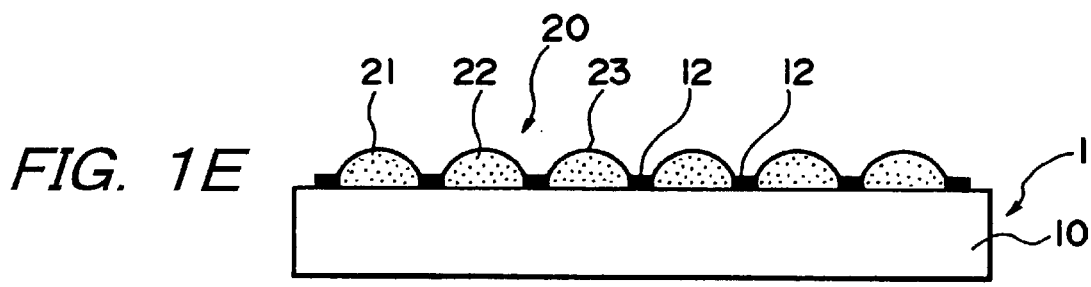

After the color pattern layer 20 is formed, the pixels 21, 22, and 23 are heated in a reflow step. The heating temperature is set at a temperature where the pixels 21, 22, and 23 melt (soften) and exhibit fluidity, according to the materials (radiation sensitive layer) of the pixels 21, 22, and 23. It is preferable to form the shading layer 12 using materials which do not melt (soften) at this temperature. When the pixels 21, 22, and 23 melt by heating, the surface of the pixels 21, 22, and 23 convexly curve by surface tension, as shown in FIG. 1E.

According to the present embodiment, the pixels 21, 22, and 23 having curved surfaces corresponding to the surfaces of the lenses and the substrate 10 form a micro lens array 1. The pixels 21, 22, and 23 have the colors of the radiation sensitive layers. Therefore, the micro lens array 1 has a function of a color filter.

Second Embodiment

FIGS. 2A–3C illustrate a method of manufacturing a micro lens array according to a second embodiment of the present invention. In the present embodiment, a micro lens array which has a function of a color filter is manufactured.

Figure 2A:
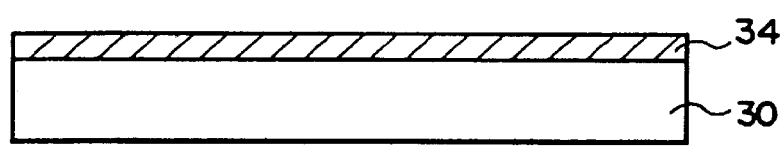
FIGS. 2A–2C illustrate a method of manufacturing a micro lens array according to a second embodiment of the present invention.

A radiation sensitive layer 34 is formed on a substrate 30 as shown in FIG. 2A. As materials for the substrate 30 and the radiation sensitive layer 34, the materials used for the substrate 10 and the radiation sensitive layer 14 in the first embodiment can be used.

The substrate 30 also functions as a support member when the radiation sensitive layer 34 is patterned by being exposed and removed with a chemical solution. Therefore, it is preferable that the substrate 30 has the mechanical strength, chemical resistance, and the like required for the process. The substrate 30 preferably has good adhesion and is capable of adhering to the radiation sensitive layer 34.

The radiation sensitive layer 34 may be formed of shading materials. As the shading materials, various materials can be used insofar as the materials do not transmit light and has durability. For example, a material in which a black dye or black pigment is dissolved in a solvent together with a binder resin can be used as a shading material. As the solvent, water or various organic solvents can be used without specific limitations. As the organic solvents, propylene glycol monomethyl ether acetate, propylene glycol monopropyl ether, methoxymethyl propionate, ethoxyethyl propionate, ethyl cellosolve, ethyl cellosolve acetate, ethyl lactate, ethyl pyruvinate, methyl amyl ketone, cyclohexanone, xylene, toluene, butyl acetate, or mixed solvents of these organic solvents can be used.

Figure 2B:
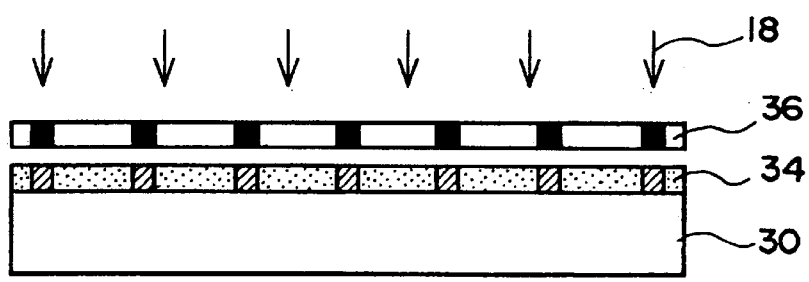

The surface of the radiation sensitive layer 34 is covered with a mask 36 having a predetermined pattern, and then the parts of the radiation sensitive layer 34 are exposed to the radiation 18, as shown in FIG. 2B. Specifically, the radiation sensitive layer 34 is exposed such that the parts to be replaced by the pixels that form a micro lens array (for example, pixels for a liquid crystal panel) can be dissolved and removed. For example, if the exposed parts in the radiation sensitive layer 34 can be dissolved and removed, the mask 36 has a pattern that allows the radiation 18 to pass through only the areas to be removed.

Figure 2C:
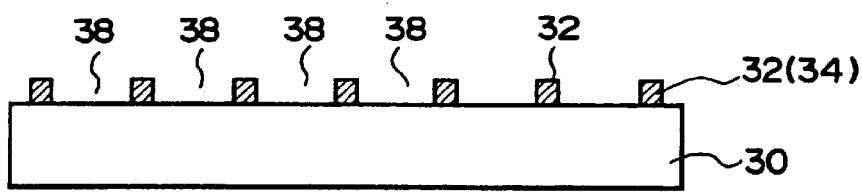

After the radiation sensitive layer 34 is exposed to the radiation 18, the radiation sensitive layer 34 is developed under predetermined conditions to remove the areas corresponding to the pixels. A partitioning member 32 is thus formed as shown in FIG. 2C. The partitioning member 32 provides a plurality of recesses 38 for the pixels.

Because the partitioning member 32 partitions the space to provide areas for the pixels, if the radiation sensitive layer 34 is formed from the shading material, the partitioning member 32 also functions as a black matrix.

Figure 3A:
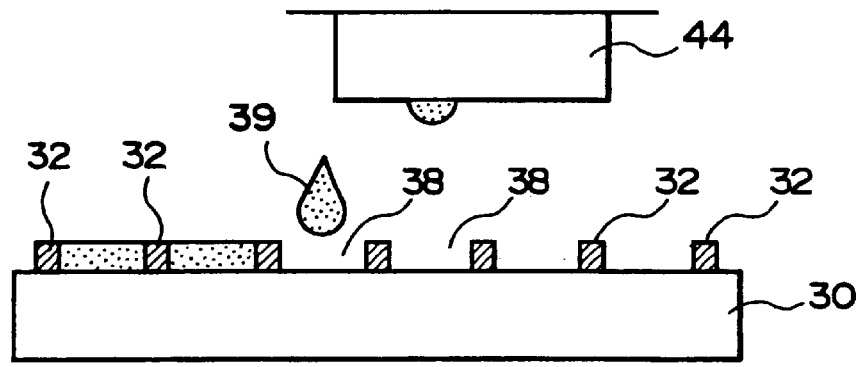
FIGS. 3A–3C illustrate a method of manufacturing a micro lens array according to the second embodiment of the present invention.

After the recesses 38 are formed on the substrate 30, each recess 38 is filled with a coloring material 39 such as an ink having a predetermined color, as shown in FIG. 3A. The coloring material 39 has at least one color used for a color filter such as red, green, or blue. The coloring material 39 having any one color is provided to any of the recesses 38 according to the same arrangement as in forming a color filter.

Although there are no specific limitations to a method of filling the recesses 38 with the coloring material 39, the ink jet method is preferable. The ink jet method makes it possible to use ink economically at high speed without any waste by applying the technique which has been put to practical use for ink jet printers.

FIG. 3A illustrates the red, green, or blue coloring materials 39 being provided to the recesses 38 using an ink jet head 44 as an example. The ink jet head 44 is placed to face the recesses 38 on the substrate 30 to jet the coloring material 39 into each recess 38.

Various types of ink jet heads that have been put to practical use for ink jet printers can be used as the ink jet head 44, such as a piezo jet type which utilizes a piezoelectric element, or a bubble jet type which uses an electrothermal energy conversion member as an energy-generating element. In these types, an injecting area and an injecting pattern of the coloring material 39 can be optionally set.

For example, if three drops of the coloring material 39 are jetted into each recess 38 at a driving frequency of 14.4 kHz (14,400 jettings per second) using the ink jet head 44 with 64 ports for jetting the coloring material 39, the time required for filling the recesses 38 for about 900,000 pixels with the coloring material 39 is as follows.

900,000×3 drops/(14,400 jettings×64 ports)=about 3 seconds

If a period of time required for the ink jet head 44 moving between the recesses 38 is taken into consideration, all the recesses 38 can be filled with the coloring material 39 within about 2–3 minutes.

Figure 3B:
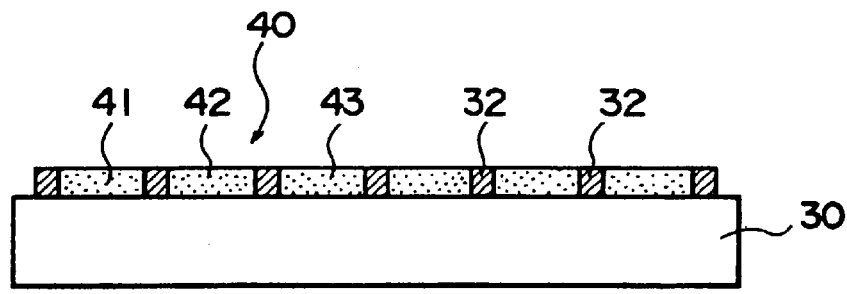

By filling the recesses 38 with the coloring material 39 having any one of the three colors, pixels 41, 42, and 43 are formed in the recesses 38, as shown in FIG. 3B. All the pixels 41, 42, and 43 form a color pattern layer 40. If the coloring material 39 contains a solvent component, the coloring material 39 is then heated to volatilize the solvent. Because the coloring material 39 shrinks when the solvent component volitilizes, it is preferable to provide a sufficient amount of the coloring material 39 for ensuring a necessary amount after shrinkage. For example, the coloring material 39 may be put into the recesses 38 as high as the top surface of the partitioning member 32. Alternatively, the coloring material 39 may be put so as to slightly exceed a capacity of the recess provided the coloring material 39 does not flow from one recess 38 into the adjoining recesses 38.

Figure 3C:
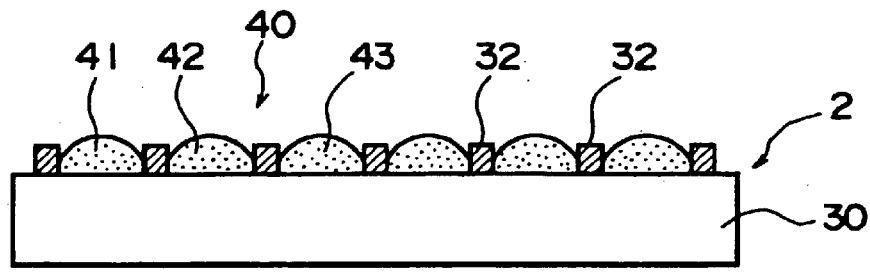

After the color pattern layer 40 is formed, the pixels 41, 42, and 43 are heated in a reflow step. The heating temperature is set at a temperature where the pixels 41, 42, and 43 melt (soften) and exhibit fluidity, depending on the materials (coloring material) of the pixels 41, 42, and 43. It is preferable to form the partitioning member 32 from materials which do notmelt (soften) at this temperature. When the pixels 41, 42, and 43 melt by heating, the surface of the pixels 41, 42, and 43 convexly curve by surface tension, as shown in FIG. 3C.

According to the present embodiment, the pixels 41, 42, and 43 having curved surfaces corresponding to lens surfaces and the substrate 30 form a micro lens array 2. Because the pixels 41, 42, and 43 are formed from the coloring material 39, the pixels 41, 42, and 43 have the color of the coloring material 39. Therefore, the micro lens array 2 has a function of a color filter.

Figure 4A:
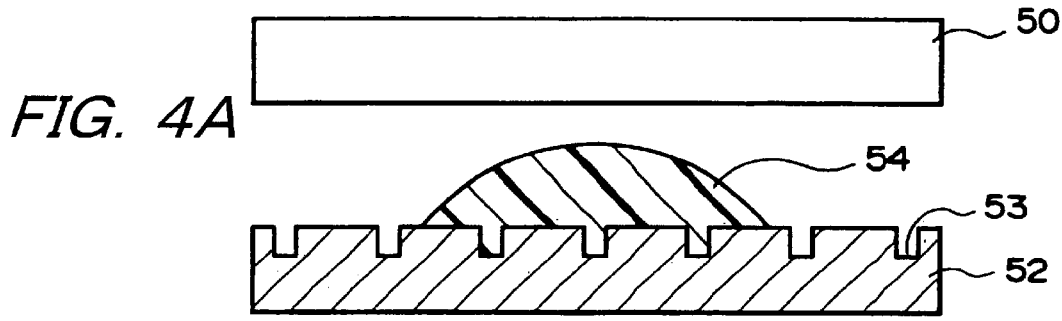
FIGS. 4A–4C illustrate a modification of the second embodiment.

FIGS. 4A–AC illustrate a modification of the above-described embodiment. In this case, the recesses are formed by the following process.

At first, a master mold 52 is attached to a substrate 50 through a coloring material filling layer precursor 54, as shown in FIG. 4A. As the substrate 50, a substrate similar to the substrate 10 in the first embodiment can be used. In the master mold 52, there is provided a groove 53 having a shape inverse to the partitioning member that is used for forming the recesses. In other words, the groove 53 is formed in the area to be partitioned for pixels that form a micro lens array. The coloring material filling layer precursor 54 becomes a coloring material filling layer 56 shown in FIG. 4C.

As the coloring material filling layer precursor 54, various materials can be used without specific limitations insofar as the materials transmit light. It is preferable that the materials do not melt (soften) at the heating temperature in the reflow step after forming the coloring material filling layer 56. Such materials can prevent deterioration of the pattern accuracy or mixing with the color pattern layer.

The coloring material filling layer precursor 54 is also preferably a material which can be cured by applying energy. Such a material can be handled as low-viscous liquid when forming the coloring material filling layer 56.

Therefore, the material can be easily provided to a minute part of the groove 53 in the master mold 52 at room temperature under normal pressure or under a similar condition. The coloring material filling layer precursor 54 in the groove 53 functions as the partitioning member which can hold a liquid in the areas for forming pixels that form a micro lens array.

As the energy for curing the coloring material filling layer precursor 54, at least either light or heat can be used. Therefore, a general-purpose exposure apparatus, a baking furnace, or a hot plate can be used, thereby reducing facility costs and space.

As examples of such a material, for example, UV-curable resins can be given. As the UV-curable resins, acrylic resins are suitably used. The UV-curable acrylic resins having excellent transparency and capable of being cured in a short period of time can be obtained by utilizing various commercially available resins or photosensitive agent.

Specific examples of a main composition of the UV-curable acrylic resins include prepolymers, oligomers, monomers, and photopolymerization initiators.

Examples of prepolymers or oligomers include acrylates such as epoxy acrylates, urethane acrylates, polyester acrylates, polyether acrylates, spiroacetal acrylates, methacrylates such as epoxy methacrylates, urethane methacrylates, polyester methacrylates and polyether methacrylates, and the like.

Examples of monomers include monofunctional monomers such as 2-ethylhexyl acrylate, 2-ethylhexyl methacrylate, 2-hydroxyethyl acrylate, 2-hydroxyethyl methacrylate, Nvinyl-2-pyrrolidone, carbitol acrylate, tetrahydrofurfuryl acrylate, isobornyl acrylate, dicyclopentenyl acrylate, and 1,3-butanediolacrylate, bifunctional monomers such as 1,6-hexanediol diacrylate, 1,6-hexanediol dimethacrylate, neopentylglycol diacrylate, neopentylglycol dimethacrylate, ethylene glycol diacrylate, polyethylene glycol diacrylate, and pentaerythritol diacrylate, and polyfunctional monomers such as trimethylolpropane triacrylate, trimethylolpropane trimethacrylate, pentaerythritol triacrylate, and dipentaerythritol hexaacrylate.

Examples of photopolymerization initiators include radical-generating compounds such as acetophenones such as 2,2-dimethoxy-2-phenylacetophenone, butylphenones such as α-hydroxyisobutylphenone and p-isopropyl-αhydroxyisobutylphenone, acetophenone halides such as ptert-butyldichloroacetophenone, p-tert-butyltrichloroacetophenone and α, α-dichloro-4-phenoxyacetophenone, benzophenones such as benzophenone and N,N-tetraethyl-4,4-diaminobenzophenone, benzyls such as benzyl and benzyl dimethyl ketal, benzoins such as benzoin and benzoin alkyl ether, oximes such as 1-phenyl-1,2-propanedione-2-(o-ethoxycarbonyl)oxime, xanthones such as 2-methylthioxanthone, 2-chlorothioxanthone, and Michler's ketone.

As required, compounds such as amines may be added to prevent oxygen from inhibiting curing, and a solvent may be added for making application easy.

As examples of such a solvent, various organic solvents such as propylene glycol monomethyl ether acetate, propylene glycol monopropyl ether, methoxymethyl propionate, ethoxyethyl propionate, ethyl cellosolve, ethyl cellosolve acetate, ethyl lactate, ethyl pyruvinate, methyl amyl ketone, cyclohexanone, xylene, toluene, and butyl acetate can be used individually or in combinations of two or more.

A predetermined amount of the coloring material filling layer precursor 54 including such UV-curable acrylic resin is dropped on the master mold 52, as shown in FIG. 4A.

Figure 4B:
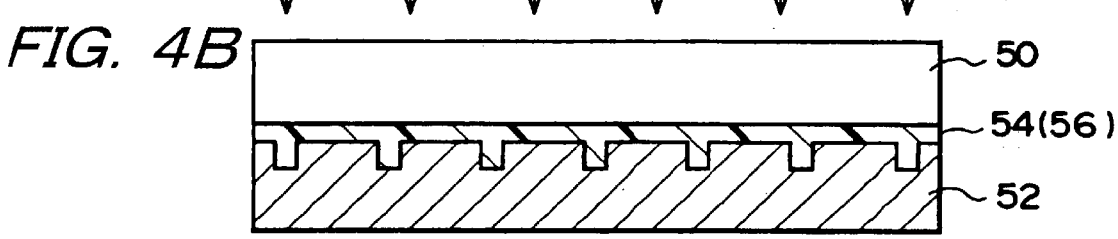

The coloring material filling layer precursor 54 is then spread to a predetermined area and cured by exposure to energy 59 such as UV light at a predetermined dose from a direction of at least either the substrate 50 or the master mold 52 to form the coloring material filling layer 56 between the substrate 50 and the master mold 52, as shown in FIG. 4B.

When spreading the coloring material filling layer precursor 54, pressure may be applied to at least either the substrate 50 or the master mold 52, as required. In the above step, the coloring material filling layer precursor 54 is dropped onto the master mold 52, however, the coloring material filling layer precursor 54 may be dropped onto the substrate 50, or onto both the substrate 50 and the master mold 52. Moreover, the coloring material filling layer precursor 54 may be applied to either the substrate 50 or the master mold 52, or both, by a spin coating method, dipping method, spray coating method, roll coating method, bar coating method, or the like.

Figure 4C:
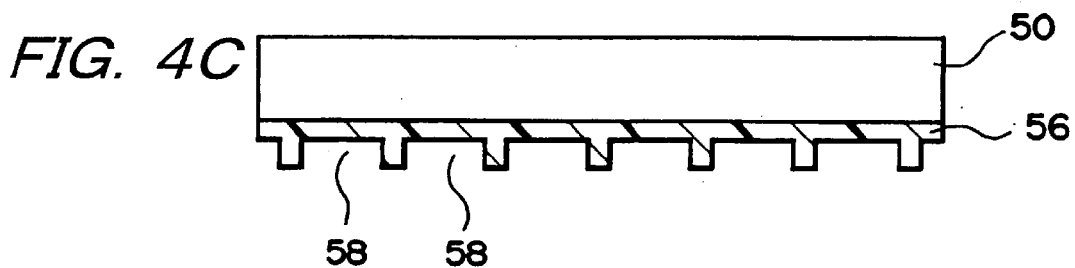

The substrate 50 and the coloring material filling layer 56 are removed together from the master mold 52 to form the coloring material filling layer 56 having a plurality of recesses 58 on the surface, as shown in FIG. 4C. Specifically, because the groove 53 in the master mold 52 has a shape partitioning the area for pixels that form a micro lens array, the partitioning member which has an inverted shape of the groove 53 provides the recesses 58 on the coloring material filling layer 56. The recesses 58 are then filled with the coloring material, and the reflow step is carried out to form a micro lens array. Since the details are the same as in the second embodiment, further description is omitted.

Third Embodiment

Figure 5:
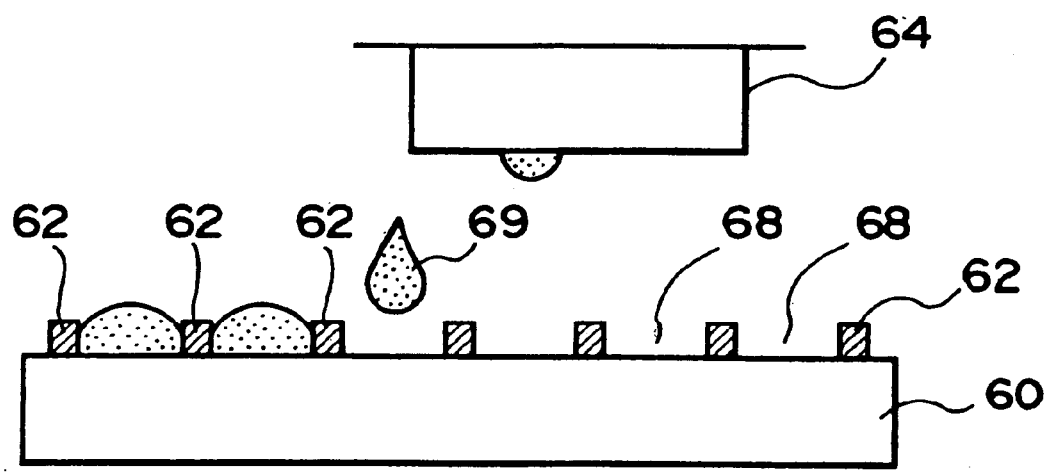
FIG. 5 illustrates a method of manufacturing a micro lens array according to a third embodiment of the present invention.

FIG. 5 illustrates a method of manufacturing a micro lens array according to a third embodiment of the present invention. In the present embodiment, a micro lens array which has a function of a color filter is manufactured.

In the present embodiment, recesses 68 are formed on a substrate 60 by a partitioning member 62, and a coloring material 69 is put into the recesses 68 from an ink jet head 64. This step is the same as in the second embodiment except that at least either the partitioning member 62 or the coloring material 69 differs from the partitioning member 32 or the coloring material 39 in the second embodiment.

In the present embodiment, the partitioning member 62 repels the coloring material 69. In other words, the partitioning member 62 has low wettability with the coloring material 69. This characteristic depends on the correlation between properties of the partitioning member 62 and the coloring material 69. Therefore, the same material as either the partitioning member 32 or the coloring material 39 in the first embodiment may be used for either the partitioning member 62 or the coloring material 69, and a different material is used for the other.

According to the present embodiment, when the coloring material 69 is put into the recesses 68, the surface of the coloring material 69 is convexly curved by being repelled by the partitioning member 62. Therefore, when the coloring material 69 is solidified and the pixels are formed, the surfaces of the pixels convexly curve, specifically, become the lenses, even if the reflow step is not performed. As described above, the pixels having lens surfaces (or the color pattern layer) can be easily formed to produce a micro lens array.

Fourth Embodiment

FIGS. 6A–7B illustrate a method of manufacturing a micro lens array according to a fourth embodiment of the present invention. In the present embodiment, a micro lens array which has a function of a color filter is manufactured.

Figure 6A:
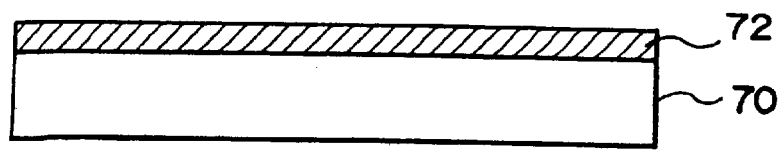
FIGS. 6A–6E illustrate a method of manufacturing a micro lens array according to a fourth embodiment of the present invention.

A resist layer 72 is formed on a substrate 70 as shown in FIG. 6A. The materials for the substrate 10 in the first embodiment can be used for the substrate 70. However, because the concavities 78 (see FIG. 6E) are formed on the substrate 70 by etching, the substrate 70 must be formed from a material which can be etched.

As a material for the resist layer 72 and a method of forming the same, the material for the radiation sensitive layer 14 and the formation method thereof in the first embodiment can be used.

Figure 6B:
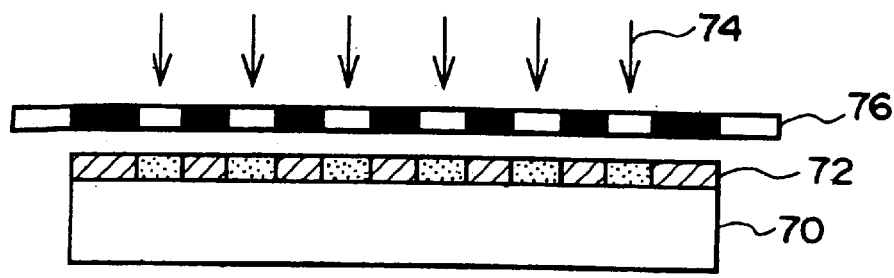

A mask 76 is then placed above the resist layer 72, and predetermined areas of the resist layer 72 are exposed to radiation 74 via the mask 76 as shown in FIG. 6B.

Figure 6C:
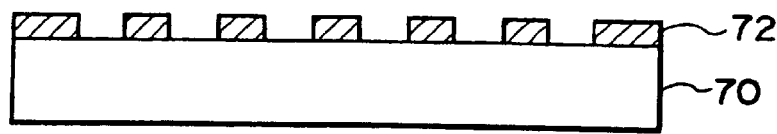
Figure 6D:
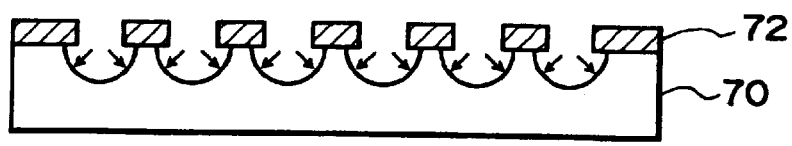
Figure 6E:
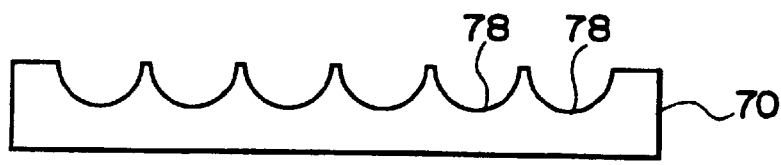

The mask 76 is patterned so that the radiation 74 passes only through the areas required for forming the concavities 78 shown in FIG. 6E. The concavities 78 are formed in the areas for forming pixels that form a micro lens array.

As the radiation 74, light with a wavelength from 200–500 nm is preferably used. If light within this wavelength range is used, photolithographic technology established in the manufacture of a liquid crystal panel and the facilities used for this technology can be utilized, thereby reducing production costs.

After the resist layer 72 is exposed to the radiation 74, the exposed areas of the resist layer 72 are selectively removed by being developed under predetermined conditions to expose a part of the surface of the substrate 70, while other areas of the substrate remain covered with the residual resist layer 72, as shown in FIG. 6C.

After the resist layer 72 is patterned, the substrate 70 is etched to a predetermined depth using the resist layer 72 as a mask, as shown in FIG. 6D. Specifically, the substrate 70 is etched in the exposed areas by isotropic etching in which the etching proceeds in all directions. For example, the isotropic etching can be performed by dipping the substrate 70 into a chemical solution (etchant) by applying wet etching. If quartz is used as the substrate 70, an aqueous solution of hydrofluoric acid and ammonium fluoride (buffered hydrofluoric acid) is used as the etchant, for example. After etching, the resist layer 72 is removed.

In this way, concavities 78 are formed on the substrate 70, as shown in FIG. 6E. The concavities 78 have concave surfaces corresponding to lens surfaces.

Figure 7A:
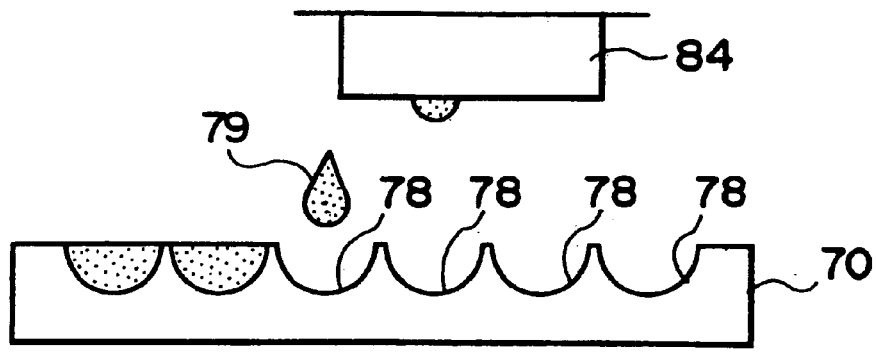
FIGS. 7A and 7B illustrate a method of manufacturing a micro lens array according to the fourth embodiment of the present invention.

The concavities 78 are then filled with a coloring material 79 using an ink jet head 84, as shown in FIG. 7A. As the ink jet head 84 and the coloring material 79, the same materials for the ink jet head 44 and the coloring material 39 of the second embodiment can be used.

Figure 7B:
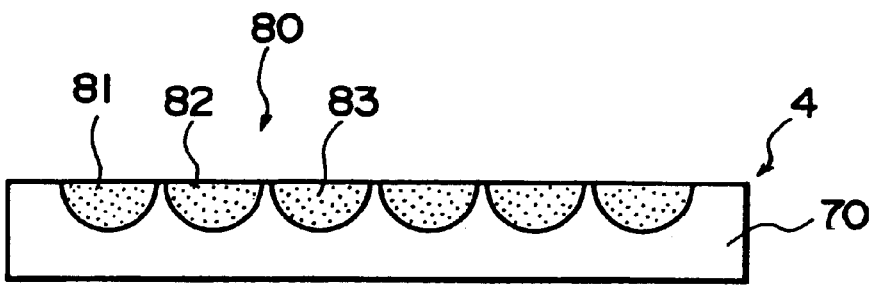

Pixels 81, 82, and 83 are thus formed in the concavities 78, as shown in FIG. 7B, and all the pixels 81, 82, and 83 form a color pattern layer 80. The interface between the pixels 81, 82, and 83 and the concavities 78 of the substrate 70 convexly curve because the pixels 81, 82, and 83 are formed along the concave surfaces of the concavities 78. Since these convex surfaces become lens surfaces, the bottom surfaces of the pixels 81, 82, and 83 function as lens surfaces.

According to the present embodiment, the color pattern layer 80 is formed in the concavities 78 having concave surfaces corresponding to the lenses. The lenses are formed in each concavity 78 by the pixels 81, 82, and 83 to form a micro lens array 4. Because the micro lens array 4 has the same color as the color pattern layer 80, the micro lens array also has a function of a color filter.

FIGS. 8A–10C illustrate a modification of the fourth embodiment. In this case, the substrate having the concavities is formed by a different method.

Figure 8A:
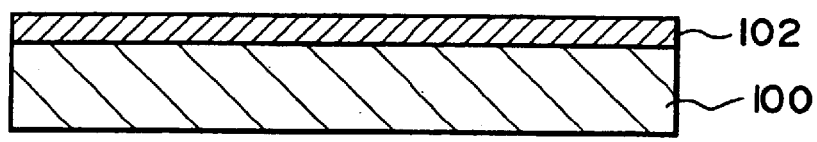
FIGS. 8A–8E illustrate a modification of the fourth embodiment.

At first, a resist layer 102 is formed on a substrate 100 for the master mold as shown in FIG. 8A. This step and the materials for the substrate 100 for the master mold and the resist layer 102 are the same as those in the fourth embodiment (see FIG. 6A).

Figure 8B:
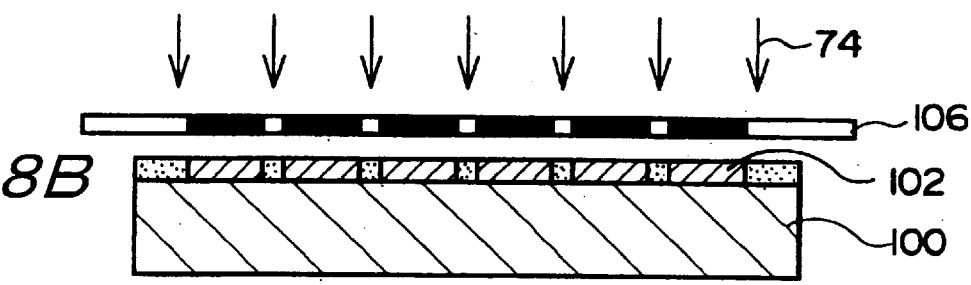

A mask 106 is placed above the resist layer 102 and predetermined areas of the resist layer 102 are exposed to the radiation 74 via the mask 106 as shown in FIG. 8B. The mask 106 has a pattern for preventing the radiation 74 from passing through the areas for forming pixels that form a micro lens array.

Figure 8C:
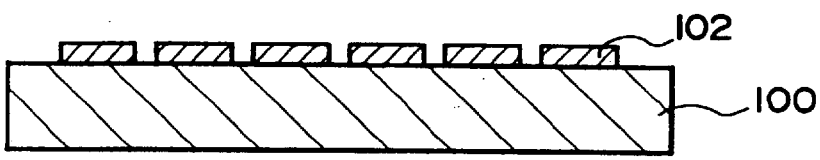

After the resist layer 102 is exposed to the radiation 74, the exposed areas are selectively removed by developing under predetermined conditions to expose a part of the surface of the substrate 100 for the master mold, while other areas of the substrate remain covered with the residual resist layer 102, as shown in FIG. 8C.

Figure 8D:
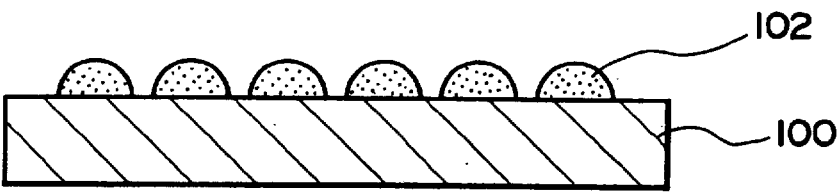

After the resist layer 102 is thus patterned, the resist layer 102 is heated in a reflow step. When the resist layer 102 melts, the surface of the resist layer 102 curves due to surface tension, as shown in FIG. 8D.

Figure 8E:
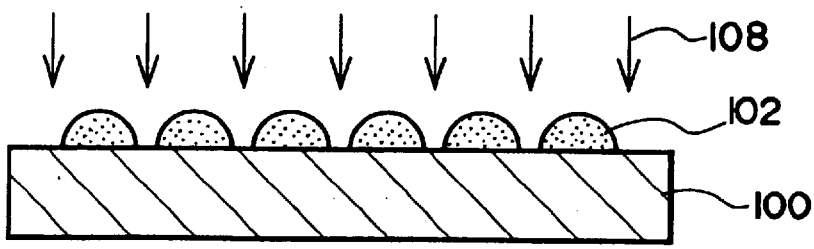

The substrate 100 for the master mold is then etched to a predetermined depth by an etchant 108 using the residual resist layer 102 as a mask as shown in FIG. 8E. Specifically, the substrate 102 is etched by anisotropic etching, for example, dry etching such as reactive ion etching.

Figure 9A:
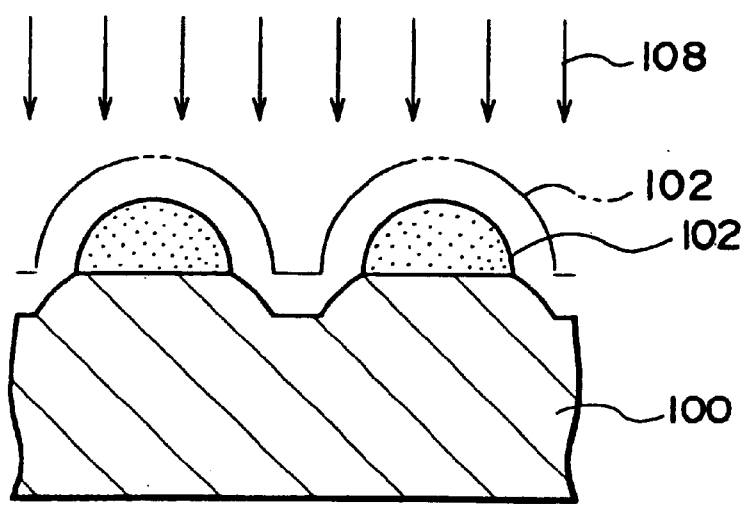
FIGS. 9A–9C illustrate a modification of the fourth embodiment.
Figure 9B:
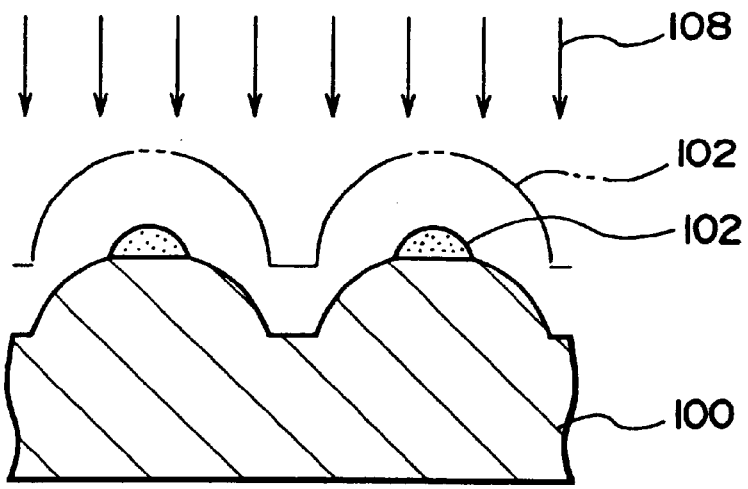
Figure 9C:
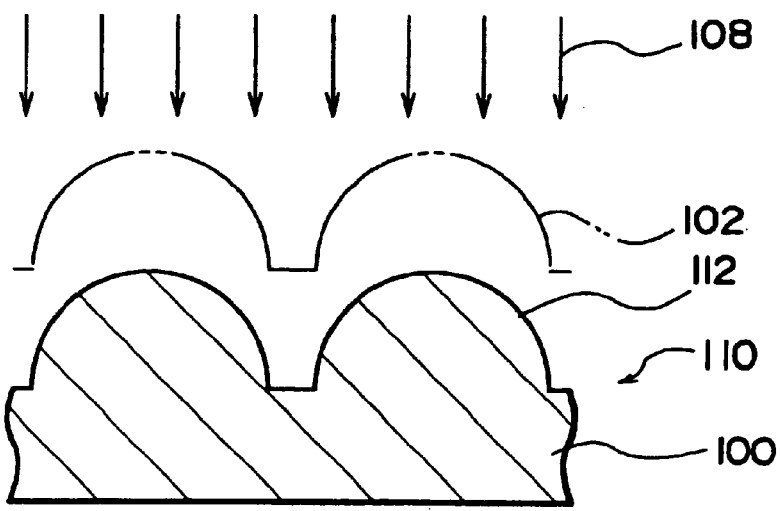

FIGS. 9A–9C illustrate a process of etching the substrate for the master mold. The substrate 100 for the master mold is partially covered with the remaining portions of the resist layer 102 each having a curved surface. The substrate 100 for the master mold is first etched in the areas not covered with the resist layer 102. Then each of the remaining portions of the resist layer 102 is etched by the etchant 108 and is gradually reduced in size from the area shown by the dot-dot-dash line to the area shown by the solid line, as shown in FIGS. 9A and 9B. Because each remaining portion of the resist layer 102 has a curved surface, the substrate 100 is gradually exposed as each remaining portion of the resist layer 102 becomes smaller, and the exposed area is continuously etched. Because the substrate 100 for the master mold is continuously and gradually etched, the substrate 100 after being etched has a curved surface. Convexities 112 are thus formed on the substrate 100 for the master mold and a master mold 110 is obtained, as shown in FIG. 9C. The convexities 112 of the master mold 110 are formed in the areas for forming pixels that form a micro lens array.

The master mold 110 is economical because it can be used repeatedly as long as durability permits. Moreover, the step of forming the master mold 110 can be omitted in the steps of forming the second or subsequent micro lens arrays, thereby reducing the number of steps as well as production costs.

Figure 10A:
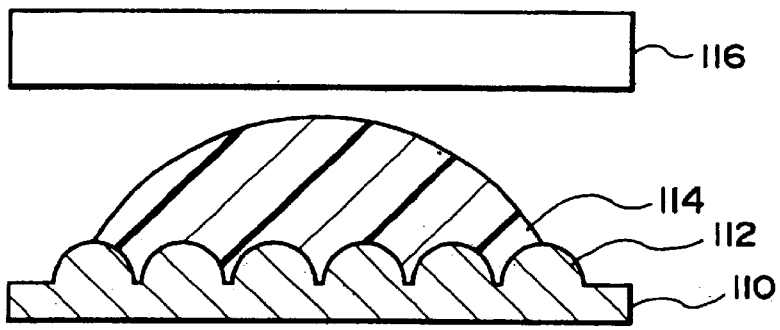
FIGS. 10A–10C illustrate a modification of the fourth embodiment.

A substrate precursor 114 is then placed on the surface of the master mold 110 on which the convexities 112 are formed, as shown in FIG. 10A. The substrate precursor 114 is spread to a predetermined area by attaching a reinforcing plate 116 to the master mold 110 through the substrate precursor 114 to form a layer of the substrate precursor 114 between the master mold 110 and the reinforcing plate 116, as shown in FIG. 10.

Although the substrate precursor 114 is put on the master mold 110 in this case, the substrate precursor 114 may be put on the reinforcing plate 116 or on both the master mold 110 and the reinforcing plate 116. Alternatively, the substrate precursor 114 may be spread to a predetermined area in advance on one or both of the master mold 110 and the reinforcing plate 116 using a spin coating method, spray coating method, roll coating method, bar coating method, dipping method, or the like.

When the master mold 110 is attached to the reinforcing plate 116 through the substrate precursor 114, pressure may be applied to the substrate precursor 114 through either the master mold 110 or the reinforcing plate 116, as required.

It is preferable that the substrate precursor 114 be a liquid material or a liquefiable material. Use of such a liquid 29 material as the substrate precursor 114 makes it easy to fill the space between the convexities 112 on the master mold 110 with the substrate precursor 114. Materials which are curable by applying energy can be used as such a liquid material, and plastic materials can be used as such a liquefiable material. There are no specific limitations to the materials of the substrate precursor 114 insofar as the materials have light transmissibility at the time of forming a substrate 118. For example, the materials used for the coloring material filling layer precursor 54 shown in FIG. 4 can be used.

There are no specific limitations to the materials of the reinforcing plate 116, insofar as it has the optical characteristics such as light transmissibility and mechanical strength which are required for a microlens array. For example, quartz, glass, or substrates or films made of plastics such as a polycarbonate, polyacrylate, polyethersulfone, polyethylene terephthalate, polymethyl methacrylate, and amorphous polyolefin can be used.

Figure 10B:
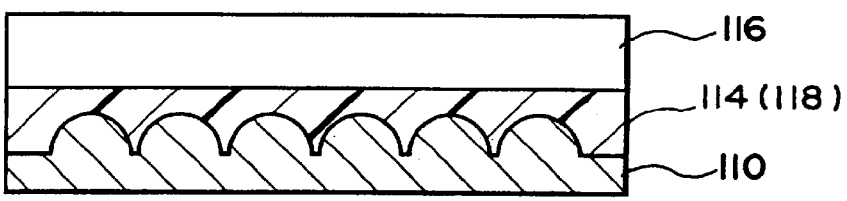

Such a material is sandwiched between the master mold 110 and the reinforcing plate 116 as shown in FIG. 10B, and the curing process is carried out according to the type of the material. For example, if a photocurable resin is used, a substrate 118 is formed by solidifying the resin by exposing the material to light under predetermined conditions.

If the substrate 118 is formed from a photocurable material, at least either the reinforcing plate 116 or the master mold 110 must have light transmissibility.

Figure 10C:
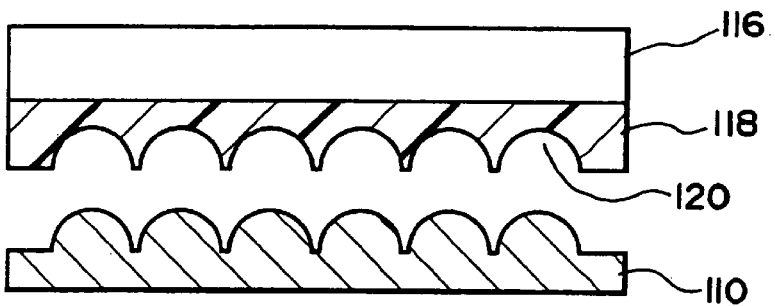

After the substrate 118 is formed on the master mold 110, the substrate 118 and the reinforcing plate 116 are removed together from the master mold 110, as shown in FIG. 10C. The substrate 118 has concavities 120 made by transferring the shape of the convexities 112. Each concavity 120 has a concavely curved surface as a lens surface corresponding to the surface of convexity 112.

If the substrate 118 itself has the characteristics such as mechanical strength required for a micro lens array, the reinforcing plate 116 may be removed from the substrate 118.

In the above step, the substrate 118 having the concavities 120 as lens surfaces is formed from the master mold 110 having the convexities 112. According to this method, because the expensive master mold 110 can be used repeatedly, frequency of reproducing the master mold due to deterioration decreases, thereby reducing manufacturing costs for the master mold 110.

After the step shown in FIG. 7A, a micro lens array which has a function of a color filter is manufactured.

Fifth Embodiment

Figure 11A:
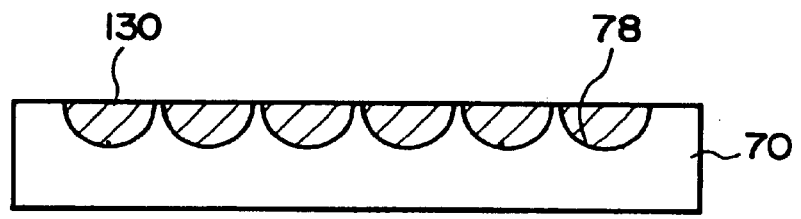
FIGS. 11A–11C illustrate a method of manufacturing a micro lens array according to a fifth embodiment of the present invention.
Figure 11B:
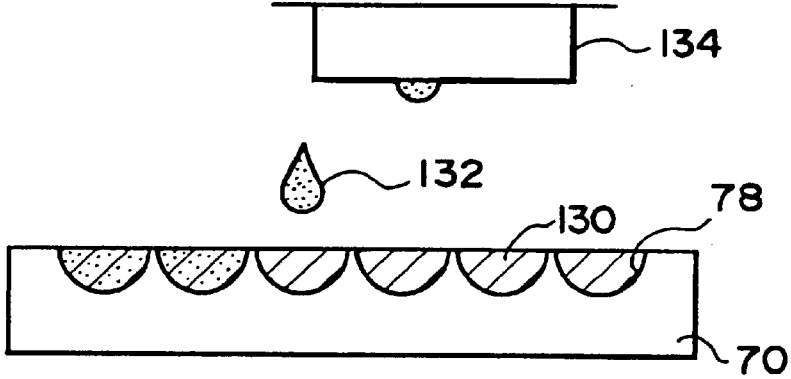
Figure 11C:
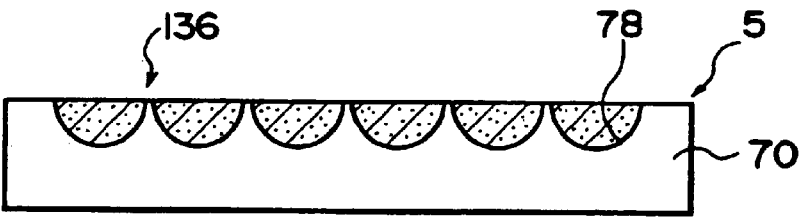

FIGS. 11A–11C illustrate a method of manufacturing a micro lens array according to a fifth embodiment of the present invention. In the present embodiment, a micro lens array which has a function of a color filter is manufactured.

In the present embodiment, as shown in FIG. 11A, a coloring material receiving layer 130 is formed in the concavities 78 of the substrate 70 shown in FIG. 6E. A coloring material 132 is then absorbed into the coloring material receiving layer 130 using an ink jet head 134 as shown in FIG. 11B, to form a color pattern layer 136, as shown in FIG. 11C.

There are no specific limitations to the materials for the coloring material receiving layer 130, insofar as the materials can absorb the coloring material 132 and have light transmissibility to such an extent that the color characteristics of the color pattern layer 136 are not impaired. For example, an aqueous solution of hydroxypropylcellulose or the like can be used.

There are no specific limitations to the materials for the coloring material 132 insofar as it can be absorbed into the coloring material receiving layer 130. For example, the materials which can be used for the coloring materials 69 and 79 in FIGS. 5 and 7 respectively can be used.

There are no specific limitations to a method of jetting the coloring material 132 into the coloring material receiving layer 130. An ink jet method is suitably used. Since the details have been described for the second embodiment, further description is omitted.

The coloring material 132 is absorbed into the coloring material receiving layer 130 to form a color pattern layer 136, as shown in FIG. 1C. Because the concavities 78 of the substrate 70 correspond to lens surfaces, a micro lens array 5 in which the interface between the color pattern layer 136 and the substrate 70 functions as lenses is manufactured.

Figure 12A:
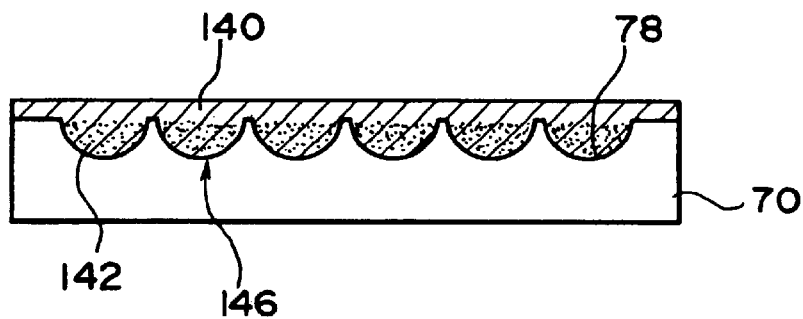
FIGS. 12A and 12B illustrate a modification of the fifth embodiment.
Figure 12B:
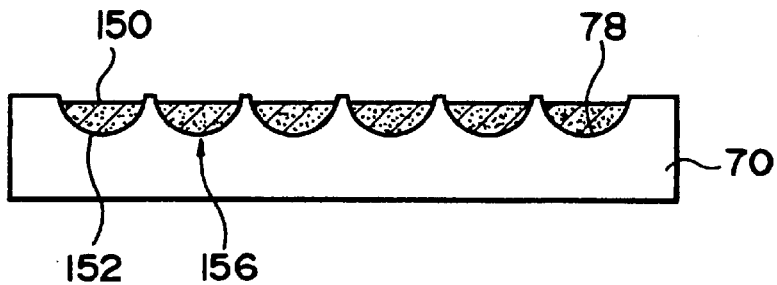

The present embodiment may be modified as shown in FIGS. 12A and 12B. For example, a coloring material receiving layer 140 is formed by providing a material in and over the concavities 78 of the substrate 70, as shown in FIG. 12A. Note that a coloring material 142 is absorbed only within the concavities 78 to form a color pattern layer 146. In FIG. 12B, a coloring material receiving layer 150 is formed in the concavities 78 only to a height lower than the surface of the substrate 70.

These modified micro lens arrays can provide the same effect as the above-described fifth embodiment.

Sixth Embodiment

FIGS. 13A–13D illustrate a method of manufacturing a micro lens array according to a sixth embodiment of the present invention. In the present embodiment, a micro lens array which has a function of a color filter is manufactured.

Figure 13A:
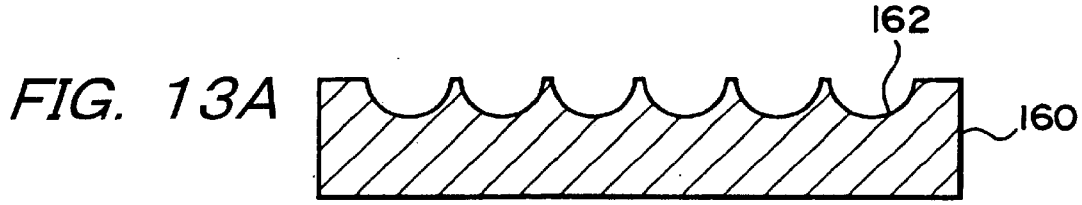
FIGS. 13A–13D illustrate a method of manufacturing a micro lens array according to a sixth embodiment of the present invention.

In the present embodiment, a master mold 160 shown in FIG. 13A is used. A plurality of concavities 162 are formed in the master mold 160. Each concavity 162 concavely curves corresponding to a lens surface. The master mold 160 can be obtained by etching a base material to form the concavities 162. As a base material which can be etched, silicon or quartz is suitable. The master mold 160 is not required to have light transmissibility unlike the substrate 70 in FIG. 6E.

Figure 13B:
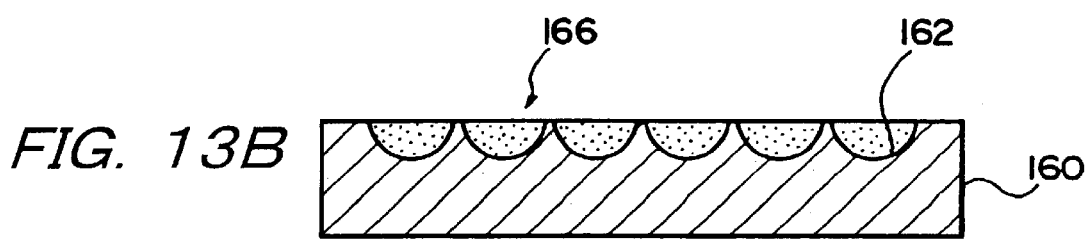

A color pattern layer 166 is formed in the concavities 162 of the master mold 160 as shown in FIG. 13B. The color pattern layer 166 is formed by filling the concavities 162 with the coloring material, as shown in FIG. 7A.

Figure 13C:
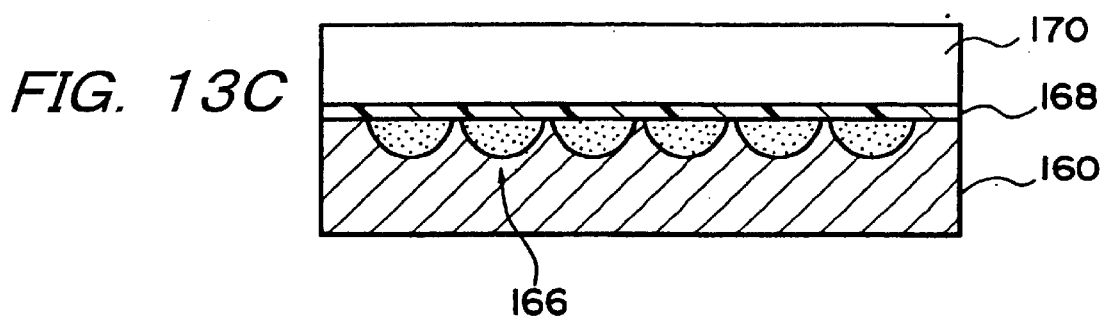

A reinforcing plate 170 is then attached to the color pattern layer 166 through a light-transmitting layer 168, as shown in FIG. 13C. Specifically, the surface of the master mold 160 on which the color pattern layer 166 is formed is attached to the reinforcing plate 170 through a precursor of the light-transmitting layer 168 to form the light-transmitting layer 168. The material for the precursor of the light transmitting layer 168 can be selected from the materials used for the coloring material filling layer precursor 54 shown in FIG. 4A. The material for the reinforcing plate 170 can be selected from the materials used for the reinforcing plate 116 shown in FIG. 10A.

Figure 13D:
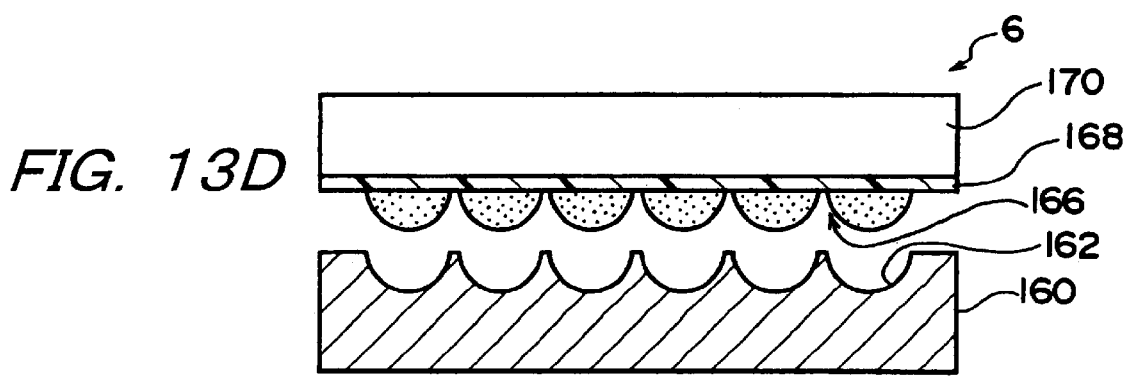

The color pattern layer 166 is then removed from the master mold 160 together with the light transmitting layer 168 and the reinforcing plate 170, as shown in FIG. 13D, to obtain a micro lens array 6. If the light transmitting layer 168 itself has the characteristics required for the micro lens array such as mechanical strength, the reinforcing plate 170 may be removed.

Figure 14A:
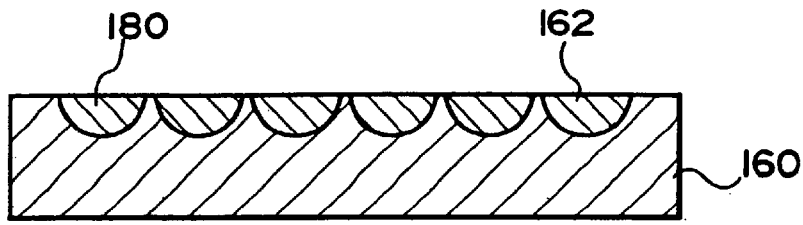
FIGS. 14A–14D illustrate a modification of the sixth embodiment.

FIGS. 14A–14D illustrate a modification of the sixth embodiment. The master mold 160 shown in FIG. 13A is used in this modification. As shown in FIG. 14A, a coloring material receiving layer 180 is formed in the concavities 162 of the master mold 160. As a material for the coloring material receiving layer 180 and a method of forming the same, the materials for the coloring material receiving layer 130 shown in FIG. 11A and the formation method thereof can be used. The coloring material receiving layer 180 may have a shape similar to that of the coloring material receiving layers 140 or 150 shown in FIG. 12A or 12B.

Figure 14B:
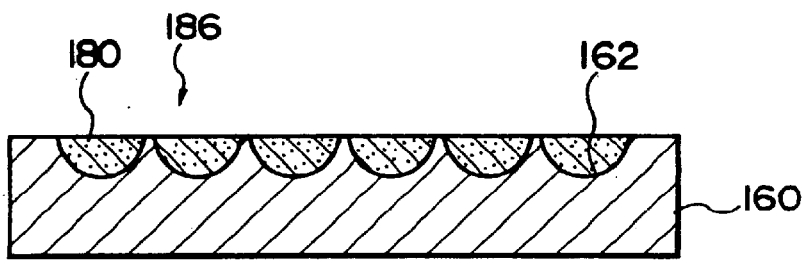

A coloring material is then absorbed into the coloring material receiving layer 180 to form a color pattern layer 186, as shown in FIG. 14B. Since the details are the same as the step shown in FIG. 11B, further description is omitted.

Figure 14C:
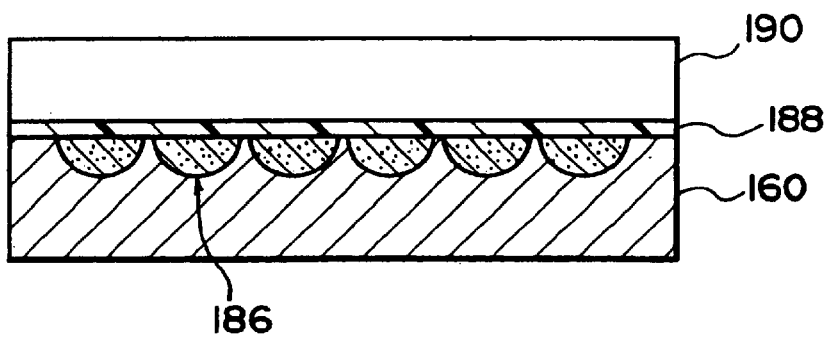
Figure 14D:
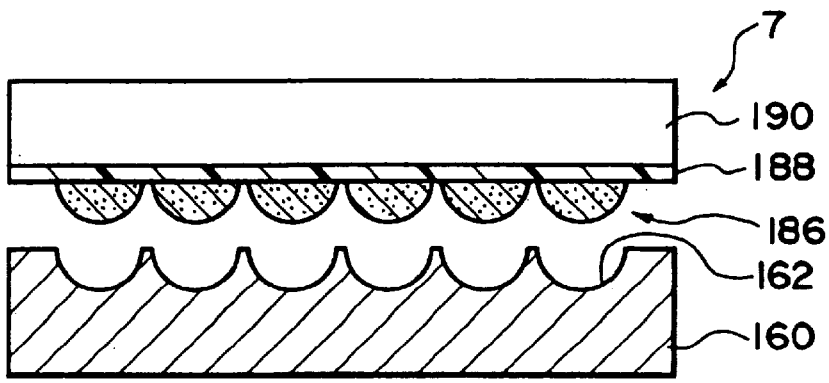

After the color pattern layer 186 is thus formed, a reinforcing plate 190 is attached to the color pattern layer 186 through a light transmitting layer 188, as shown in FIG. 14C. The color pattern layer 186 is removed from the master mold 160 together with the reinforcing plate 190 and the light transmitting layer 188, as shown in FIG. 14D.

The process of this modification is the same as the above sixth embodiment except for the step of forming the color pattern layer 186. The resulting micro lens array 7 also provides the same effect.

Figure 15:
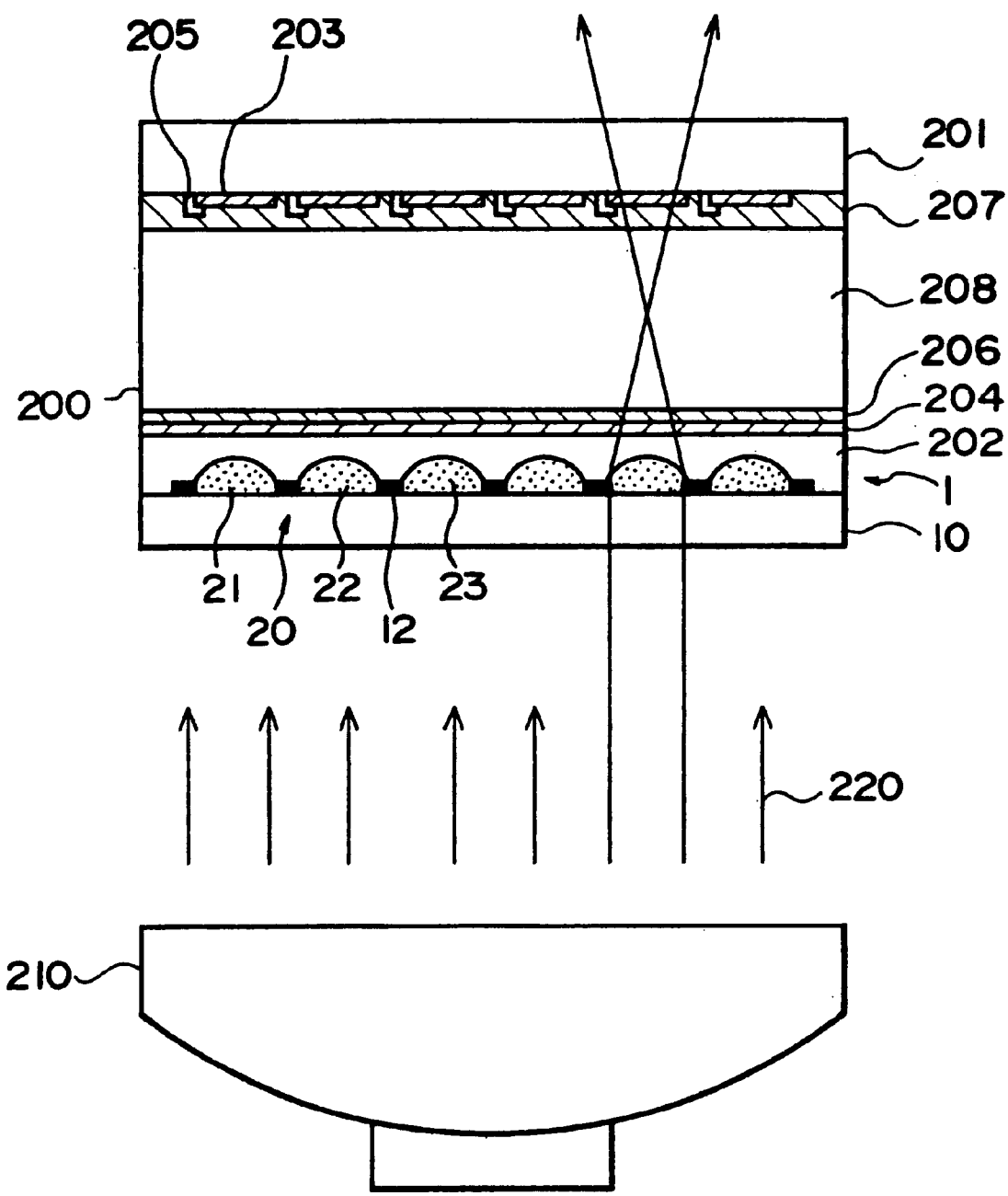
FIG. 15 illustrates an electronic device provided with a micro lens array according to the present invention.

FIG. 15 illustrates part of a liquid crystal projector to which the micro lens array according to the present invention is applied. This liquid crystal projector comprises a light valve 200 into which the micro lens array 1 manufactured by the method of the first embodiment is incorporated and a lamp 210 as a light source.

The micro lens array 1 is placed so that the color pattern layer 20 including the pixels 21, 22, and 23 which form the lenses faces in a direction opposite to the lamp 210. A light transmitting layer 202 is formed on the color pattern layer 20 with a transparent electrode film 204 and an alignment film 206 laminated thereon. A TFT substrate 201 is disposed such that there is a gap between the TFT substrate 201 and the alignment layer206. Transparent individual electrodes203 and thin film transistors 205 are provided on the TFT substrate 201, and an alignment layer 207 is formed thereon. The TFT substrate 201 is placed so that the alignment layer 207 faces the alignment layer 206.

A liquid crystal 208 is sealed between the alignment layers 206 and 207 and is driven by applying voltage controlled by the thin film transistor 205.

This liquid crystal projector can display a clear image because light 220 emitted from the lamp 210 is converged on the pixels 21, 22, and 23 which form the lenses.

If the lenses of the pixels are convex, the following relation has to be established between the light refractive index "na" of the light transmitting layer 202 and the light refractive index "nb" of the pixels 21, 22, and 23:

$$na < nb$$

Satisfying this condition makes it possible to pass the light from a medium with a higher refractive index to a medium with a lower refractive index. Specifically, the light 220 is refracted and converged to a direction away from the normal line of the interface between the two media to illuminate the screen.

If the lenses of the pixels are concave, the following relation has to be established between the light refractive index "na'" of the light transmitting layer 202 and the light refractive index "nb'" of the pixels 21, 22, and 23:

$$na' > nb'$$

Satisfying this condition makes it possible to pass the light from a medium with a lower refractive index to a medium with a higher refractive index. Specifically, the light 220 is refracted and converged to a direction approaching the normal line of the interface between the two media to illuminate the screen.

What is claimed is:

1. A method of manufacturing a micro lens array comprising the steps of:

forming a color pattern layer including a plurality of pixels in a predetermined arrangement on a light transmitting substrate; and by surface tension or repellence curving surfaces of the pixels in the color pattern layer corresponding to lens surfaces.

2. The method of manufacturing a micro lens array as defined in claim 1, wherein the pixels in the color pattern layer are formed with multiple colors;

wherein in the formation of the color pattern layer, a step of forming a radiation sensitive layer having any one of the multiple colors on the substrate and then selectively removing part of the radiation sensitive layer to form part of the pixels is repeated; and wherein in the step of curving the surfaces of the pixels, the pixels are melted by heating to cause the surfaces of the pixels to be convexly curved by surface tension.

3. The method of manufacturing a micro lens array as defined in claim 1, wherein the step of forming the color pattern layer includes a step of attaching a surface of a master mold on which a plurality of projections are formed to the substrate through a coloring material filling layer precursor, a step of removing the master mold from the coloring material filling layer precursor to form a coloring material filling layer having a plurality of recesses on the substrate, and a step filling each of the recesses with a coloring material having a predetermined color to form the pixels from the coloring material in the recesses; and wherein in the step of curving the surfaces of the pixels, the coloring material in the recesses is melted by heating to cause the surface of the coloring material to be convexly curved by surface tension.

4. The method of manufacturing a micro lens array as defined in claim 1, wherein the step of forming the color pattern layer includes a step of providing a partitioning member on the substrate to form a plurality of recesses capable of holding a liquid, and a step of filling each of the recesses with the coloring material having a predetermined color to form the pixels from the coloring material in the recesses; and wherein in the step of curving the surfaces of the pixels, the coloring material in the recesses is melted by heating to cause the surface of the coloring material to be convexly curved by surface tension.

5. The method of manufacturing a micro lens array as defined in claim 1, wherein the step of forming the color pattern layer includes a first step of providing a partitioning member on the substrate to form a plurality of recesses capable of holding a liquid, and a second step of filling each of the recesses with the coloring material having a predetermined color to form the pixels from the coloring material in the recesses, the partitioning member having the property of repelling the coloring material;

wherein the step of curving the surfaces of the pixels is carried out in the second step; and wherein the surface of the coloring material in the recesses is convexly curved by being repelled by the partitioning member.

6. The method of manufacturing a micro lens array as defined in claim 4, wherein the partitioning member is formed of a shading material.

7. The method of manufacturing a micro lens array as defined in claim 3, wherein the coloring material is provided by an ink jet method.

8. A micro lens array manufactured by the method as defined in claim 1.

9. A display device comprising the micro lens array as defined in claim 8 and a light source which emits light toward the micro lens array.

10. A method of manufacturing a micro lens array comprising the steps of:

forming a light transmitting substrate to be a part of the micro lens array in which a plurality of concavities having curved surfaces corresponding to lens surfaces are formed in a predetermined arrangement; and forming a color pattern layer in the concavities.

11. The method of manufacturing a micro lens array as defined in claim 10, wherein the step of forming the substrate comprises a step of forming the concavities by etching a flat surface.

12. The method of manufacturing a micro lens array as defined in claim 10, wherein the step of forming the substrate comprises:

a step of attaching a surface of a master mold on which a plurality of convexities having a shape inverse to the concavities are formed to a reinforcing plate through a substrate precursor; and a step of removing the master mold from the substrate precursor to form the substrate having the concavities on the reinforcing plate.

13. The method of manufacturing a micro lens array as defined in claim 12, further comprising a step of removing the reinforcing plate from the substrate.

14. The method of manufacturing a micro lens array as defined in claim 10, wherein the step of forming the color pattern layer is carried out by filling each of the concavities with a coloring material having a predetermined color.

15. The method of manufacturing a micro lens array as defined in claim 14, wherein the coloring material is provided by an ink jet method.

16. The method of manufacturing a micro lens array as defined in claim 10, wherein the step of forming the color pattern layer includes a step of forming a coloring material receiving layer in a predetermined area including the concavities and a step of causing the coloring material having a predetermined color to be absorbed into the coloring material receiving layer in the concavities.

17. The method of manufacturing a micro lens array as defined in claim 16, wherein the coloring material receiving layer is continuously formed in and over the concavities; and wherein the coloring material is absorbed into the coloring material receiving layer only within the concavities.

18. The method of manufacturing a micro lens array as defined in claim 17, wherein the coloring material receiving layer is formed only in the concavities.

19. A micro lens array manufactured by the method as defined in claim 10.

20. A display device comprising the micro lens array as defined in claim 19 and a light source which emits light toward the micro lens array.

21. A method of manufacturing a micro lens array comprising:

a step of forming a master mold including a plurality of concavities having curved surfaces corresponding to lens surfaces;

a step of forming a color pattern layer in the concavities; and a step of removing the color pattern layer from the master mold.

22. The method of manufacturing a micro lens array as defined in claim 21, further comprising a step of attaching the color pattern layer to a reinforcing plate through a light transmitting layer precursor to form a light transmitting layer after the step of forming the color pattern layer and before the step removing the color pattern layer;

wherein the color pattern layer is removed from the master mold together with the reinforcing plate and the light transmitting layer in the step of removing the color pattern layer.

23. The method of manufacturing a micro lens array as defined in claim 22, further comprising a step of removing the reinforcing plate from the light transmitting layer.

24. The method of manufacturing a micro lens array as defined in claim 22, wherein the step of forming the color pattern layer includes a step of forming a coloring material receiving layer in a predetermined area including the concavities and a step of causing a coloring material having a predetermined color to be absorbed into the coloring material receiving layer in the concavities.

25. The method of manufacturing a micro lens array as defined in claim 24, wherein the coloring material receiving layer is continuously formed in and over the concavities; and wherein the coloring material is absorbed into the coloring material receiving layer only within the concavities.

26. The method of manufacturing a micro lens array as defined in claim 24, wherein the coloring material receiving layer is formed only in the concavities.

27. The method of manufacturing a micro lens array as defined in claim 24, wherein the coloring material is provided by an ink jet method.

28. A micro lens array manufactured by the method as defined in claim 21.

29. A display device comprising the micro lens array as defined in claim 28 and a light source which emits light toward the micro lens array.

* * * * *

UNITED STATES PATENT AND TRADEMARK OFFICE
CERTIFICATE OF CORRECTION

PATENT NO. : 6,297,911 B1
DATED : October 2, 2001
INVENTOR(S) : Takao Nishikawa et al.

It is certified that error appears in the above-identified patent and that said Letters Patent is hereby corrected as shown below:

Title page,
Item [63], Related US Data: delete all continuing data.

Column 1,
Lines 5-8, delete lines referring to continuing data.

Column 8,
Line 32, "notmelt" should be -- not melt --.
Line 43, "4A-AC" should be -- 4A-4C --.

Column 9,
Line 31, "Nvinyl" should be -- N-vinyl --.
Line 45, ""∝hydroxisobutylphenone" should be -- ∝–hydroxisobutylphenone --
Line 46, "ptert" should be -- p-tert --.

Column 13,
Line 8, delete "29".

Column 14,
Line 20, "FIG. 1C" should be -- FIG. 11C --.
Line 23, delete "is" and insert -- are -- therefor.

Column 15,
Line 43, "layer206" should be -- layer 206 -- and "electrodes203" should be
-- electrodes 203 --.

UNITED STATES PATENT AND TRADEMARK OFFICE
CERTIFICATE OF CORRECTION

PATENT NO.   : 6,297,911 B1
DATED        : October 2, 2001
INVENTOR(S)  : Takao Nishikawa et al.

It is certified that error appears in the above-identified patent and that said Letters Patent is hereby corrected as shown below:

<u>Column 18,</u>
Line 6, "claim 17" should be -- claim 16 --.
Line 40, "claim 22" should be -- claim 21 --.

Signed and Sealed this

Eighteenth Day of June, 2002

*Attest:*

*Attesting Officer*

JAMES E. ROGAN
*Director of the United States Patent and Trademark Office*